US009126773B2

(12) United States Patent
Hino et al.

(10) Patent No.: US 9,126,773 B2
(45) Date of Patent: Sep. 8, 2015

(54) MACHINE, A SYSTEM, AND A METHOD FOR SUCTIONING POWDERS AND GRANULAR MATERIALS

(75) Inventors: Takehiko Hino, Toyokawa (JP); Harumitsu Asano, Toyokawa (JP); Hirofumi Asai, Toyokawa (JP)

(73) Assignee: SINTOKOGIO, LTD., Aichi (JP)

(*) Notice: Subject to any disclaimer, the term of this patent is extended or adjusted under 35 U.S.C. 154(b) by 540 days.

(21) Appl. No.: 13/514,866

(22) PCT Filed: Dec. 10, 2009

(86) PCT No.: PCT/JP2009/070700
§ 371 (c)(1),
(2), (4) Date: Jun. 8, 2012

(87) PCT Pub. No.: WO2011/070668
PCT Pub. Date: Jun. 16, 2011

(65) Prior Publication Data
US 2012/0245743 A1    Sep. 27, 2012

(51) Int. Cl.
*B65G 53/24* (2006.01)
*B65G 69/08* (2006.01)
*G05D 7/00* (2006.01)

(52) U.S. Cl.
CPC .............. *B65G 53/24* (2013.01); *B65G 69/08* (2013.01)

(58) Field of Classification Search
CPC ........ B65G 53/24; B65G 69/08; B65G 53/66; B65G 65/34; B65G 65/36
USPC ........ 700/282, 283; 222/52, 63, 64, 160, 162, 222/163, 204, 205, 251, 320, 405, 416; 460/108, 113, 114, 12, 141–146
See application file for complete search history.

(56) References Cited

U.S. PATENT DOCUMENTS

| 4,072,059 | A | * | 2/1978 | Hamilton | 73/864.31 |
| 5,339,871 | A | * | 8/1994 | Collins et al. | 141/1 |

(Continued)

FOREIGN PATENT DOCUMENTS

| CN | 2260075 Y | * | 8/1997 | B65G 49/00 |
| CN | 2431258 Y | * | 5/2001 | B01D 46/00 |

(Continued)

OTHER PUBLICATIONS

International Search Report dated Mar. 23, 2010 issued in International Application No. PCT/JP2009/070700.

*Primary Examiner* — M. N. Von Buhr
(74) *Attorney, Agent, or Firm* — Finnegan, Henderson, Farabow, Garrett & Dunner, L.L.P.

(57) ABSTRACT

The object of the present invention is to suction all powders and granular materials in a container such as a drum to transport them. The powders and granular materials have low flowability, since over time they have been compacted due to their own weight or vibrations from the outside or humidity. The machine (1) for suctioning powders and granular materials comprises movable tables (2, 3) that the container that stores the powders and granular materials is mounted on and that horizontally move, a device (8) for driving the tables, a double-layered suction nozzle (11) that is located above the tables and is connected to a suction source, a device (12) for moving the nozzle up and down in the container mounted on the tables, and a controller for controlling the devices, wherein, while moving the tables, the suction nozzle is inserted in proper positions in the container to suction the powders and granular materials.

14 Claims, 9 Drawing Sheets

(56) References Cited

U.S. PATENT DOCUMENTS

| | | | |
|---|---|---|---|
| 6,454,141 B1 * | 9/2002 | Breen et al. | 222/405 |
| 2002/0121196 A1 * | 9/2002 | Thakur et al. | 96/224 |
| 2009/0049955 A1 * | 2/2009 | Memoli et al. | 75/770 |

FOREIGN PATENT DOCUMENTS

| | | | | |
|---|---|---|---|---|
| JP | 1992-56130 | 5/1992 | | |
| JP | 09-254942 | 9/1997 | | |
| JP | 2001-130743 | 5/2001 | | |
| JP | 2002-137827 | 5/2002 | | |
| JP | 2003-072954 | 3/2003 | | |
| JP | 2003-341839 | 12/2003 | | |
| JP | 2005028285 A * | 2/2005 | | B07C 5/344 |
| JP | 2005225511 A * | 8/2005 | | B65B 1/32 |
| JP | 2008-086845 | 4/2008 | | |
| JP | 2008181013 A * | 8/2008 | | G03G 15/08 |
| JP | 2010-042875 | 2/2010 | | |

* cited by examiner

MACHINE, A SYSTEM, AND A METHOD FOR SUCTIONING POWDERS AND GRANULAR MATERIALS

TECHNICAL FIELD

The present invention relates to a machine and a method for suctioning all powders and granular materials with no remaining amount. The powders and granular materials are stored in a container, such as a drum. The powders and granular materials have low flowability due to compaction that occurs over time by their own weight or vibrations from the outside or moisture.

BACKGROUND ART

Conventionally, to suction and transport powders and granular materials that have a poor flowability, the containers for them are rotated on a horizontal stage. An L-type nozzle for suctioning them is inserted from the top. The powders and granular materials can be suctioned by moving the nozzle up and down or laterally (see Japanese Patent Laid-open Publication No. 2001-130743).

However, for suctioning compacted powders and granular materials, since the powders and granular materials that have been compacted are robust or hard, a lump that is larger than the diameter of the nozzle may clog the nozzle. Thus the lumped powders and granular materials must be crushed into small particles to be suctioned. If one tries to crush the lump for suctioning it while the nozzle is inserted into the powders and granular materials, a large lateral force will be applied to the tip of the nozzle, to thereby break the nozzle. Therefore, the nozzle is slowly lowered to suction the powders and granular materials little by little.

Further, the same situation as above occurs when a drum is inclined and rotated so that the powders and granular materials that gathered at the bottom are suctioned (see Japanese Patent Laid-open Publication No. 2003-072954). If the nozzle is inserted into the powders and granular materials, a large lateral force will be applied to the tip of the nozzle, to thereby break it. In addition, since the powders and granular materials are not fluidized, a dead space is formed at a part where the nozzle does not reach. Thus the powders and granular materials are not all suctioned. If air is exhaled into the dead space, the powders and granular materials are violently scattered.

Thus a machine for suctioning all the powders and granular materials that are stored in a container, such as a drum, is needed.

DISCLOSURE OF INVENTION

The object of the present invention is to suction all powders and granular materials in a container, such as a drum, and transport them, as over time powders and granular materials come to have low flowability due to the compaction of their own weight, the compaction of vibrations from the outside, moisture, and so on. Herein the word "transport" does not necessarily mean to convey powders and granular materials in a container to a distant place, but may mean to transfer them, for example, to an adjacent container.

Other objects are to minimize the air flow to be suctioned, and to improve the safety of operators and the safeness of the machine.

The present invention was conceived to achieve these objects. The machine for suctioning powders and granular materials of the first invention is a machine that is used for a machine for transporting powders and granular materials that are stored in a container. It comprises a movable table that a container that stores powders and granular materials is mounted on and that moves in a horizontal plane, a device for driving the movable table, a double-layered suction nozzle that is located above the movable table and that is connected to a suctioning source, a device for moving the suction nozzle up and down in the container that is mounted on the movable table, and a controller that controls the device for driving the movable table and the device for moving the suction nozzle up and down. It is characterized in that, while the movable table is moved, the suction nozzle is inserted in proper positions in the container to suction the powders and granular materials in it.

The machine for suctioning powders and granular materials of the second invention comprises a stationary table that a container that stores powders and granular materials is mounted on, that is horizontally fixed, and that has a measuring device, a double-layered suction nozzle that is located above the stationary table and that is connected to a suctioning source, a device for moving the suction nozzle up and down in the container that is mounted on the stationary table, and a controller that controls the device for moving the suction nozzle up and down. It is characterized in that the suction nozzle is inserted in proper positions in the container to suction the powders and granular materials in it.

The machine for suctioning powders and granular materials of the present invention may comprise a device for detecting a cover of the container that stores powders and granular materials or a device for detecting the container that stores powders and granular materials on the movable table or the stationary table. So the safeness of the machine can be improved.

Further, by housing, within partitions, the machine for suctioning powders and granular materials of the present invention, the safety of operators working in the system for suctioning powders and granular materials can be improved. In that system, by installing a dust-collecting hood above the container that stores powders and granular materials the safety of operators is further improved.

The method for suctioning powders and granular materials of the present invention is a method for suctioning powders and granular materials to transport the powders and granular materials in a container by using the machine for suctioning powders and granular materials of the first invention. It is characterized by comprising the steps of mounting the container that stores the powders and granular materials on the movable table, moving the movable table to arbitrary positions by the device for driving the movable table, and suctioning the powders and granular materials by inserting the suction nozzle into a plurality of positions in the container.

Further, the method for suctioning powders and granular materials of the present invention is a method for suctioning powders and granular materials to transport the powders and granular materials in a container by using the machine for suctioning powders and granular materials of the second invention. It is characterized by comprising the steps of mounting the container that stores the powders and granular materials on the stationary table and suctioning the powders and granular materials by inserting the suction nozzle into a plurality of positions in the container.

By computing the positions in the container that stores the powders and granular materials to find the positions for the suction nozzle to be inserted in based on the size of the container that is input, the best routing pattern for the positions to be inserted can be determined. Thus the best routing patterns for the positions are determined for various sizes of containers.

In the step of suctioning powders and granular materials an air flow that is suctioned by a suctioning source is adjusted based on the measurements of the remaining amounts of the powders and granular materials in the container or the measurements by a pressure sensor in the container. If the remaining amounts are large, the air flow by the suctioning source is increased, to thereby suction a larger amount of powders and granular materials. If the amounts are small, the air flow is decreased to the level that is properly required for suctioning the powders and granular materials. Thus energy can be saved.

As discussed above, the present invention makes it possible to suction all powders and granular materials in a container by inserting a double-layered suction nozzle in it while horizontally moving, to appropriate positions, a movable table on which the container that stores powders and granular materials is mounted or by inserting the double-layered suction nozzle at proper positions in the container that stores powders and granular materials and that is fixed on a table. Further, the best route for the positions for inserting the suction nozzle is determined by inputting the size of the container into a controller. Thus the time for suctioning powders and granular materials can be shortened. Further, the air flow by the suctioning source is adjusted by feeding back to the controller the measurements of the remaining amounts of the powders and granular materials or the measurements by a pressure sensor. Thus the suctioning source is efficiently operated and energy is saved.

The present inventions will become more fully understood from the detailed description given below. However, the detailed description and the specific embodiment are illustrations of desired embodiments of the present inventions, and are described only for an explanation. Various changes and modifications will be apparent to those of ordinary skill in the art on the basis of the detailed description.

The applicant has no intention to dedicate to the public any disclosed embodiment. Among the disclosed changes and modifications, those which may not literally fall within the scope of the present claims constitute, therefore, a part of the present inventions in the sense of the doctrine of equivalents.

The use of the articles "a," "an," and "the" and similar referents in the specification and claims are to be construed to cover both the singular and the plural, unless otherwise indicated herein or clearly contradicted by the context. The use of any and all examples, or exemplary language (e.g., "such as") provided herein, is intended merely to better illuminate the inventions, and so does not limit the scope of the inventions, unless otherwise claimed.

BEST MODE FOR CARRYING OUT THE INVENTION

Below, an embodiment for working the present invention is described. The same or corresponding elements are denoted by the same numbers, and so a duplicate explanation is omitted.

Figures 1, 2:
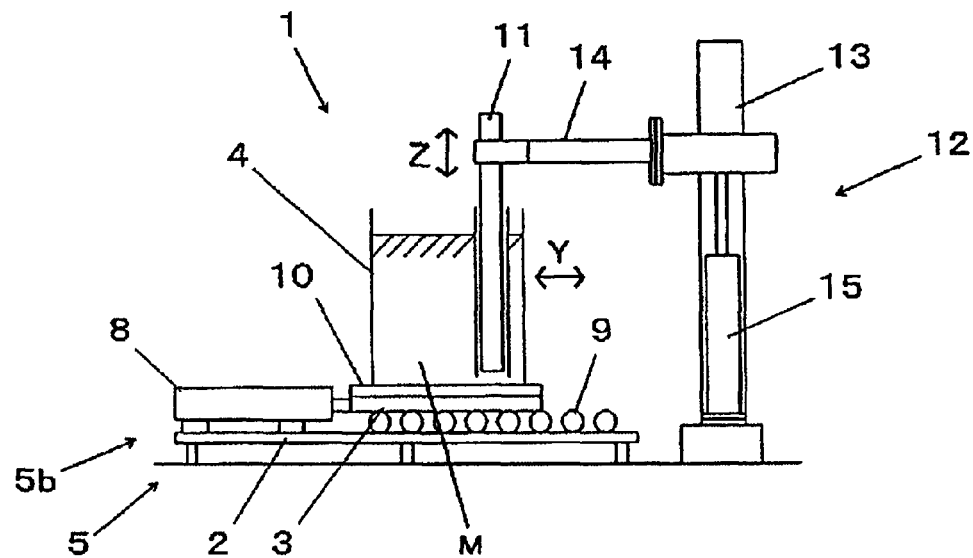
FIG. 1 is a side view of the machine for suctioning powders and granular materials of the present invention.
FIG. 2 is a plan view of the machine for suctioning powders and granular materials of the present invention.

An example of the machine for suctioning powders and granular materials of the present invention is described in detail with reference to FIGS. 1, 2, and 3. As shown in FIG. 1, the machine 1 for suctioning powders and granular materials comprises a movable table that a container 4 that stores powders and granular materials M is mounted on and that horizontally moves, a device 5 for driving the movable table, a double-layered suction nozzle 11 that is located above the movable table and that is connected to a suctioning source, and a device 12 for moving the suction nozzle 11 up and down in the container 4 that is mounted on the movable table.

The movable table consists of a movable table 2 for the X-axis and a movable table 3 for the Y-axis that move in the X and Y directions, respectively. The movable table 2 for the X-axis moves in the X direction. The movable table 3 for the Y-axis moves in the Y direction. The movable table 3 for the Y-axis is placed on the movable table 2 for the X-axis.

The device 5 for driving the movable table consists of a device 5a for driving in the X-axis the movable table 2 for the X-axis and a device 5b for driving in the Y-axis the movable table 3 for the Y-axis.

The device 5a for driving the movable table for the X-axis comprises multiple rollers 7 that are provided under the movable table 2 for the X-axis and a cylinder 6 for moving the movable table 2 back and forth on the rollers 7. The rollers 7 are located in a direction perpendicular to the long side of the movable table 2 and in contact with the bottom of it. The cylinder 6 is located at the long side of the movable table 2.

The device 5b for driving the movable table for the Y-axis comprises multiple rollers 9 that are provided on the movable table 2 for the X-axis and a cylinder 8 for moving the movable table 3 back and forth on the rollers 9. The rollers 9 are located in a direction parallel to the long side of the movable table 2 and in contact with the bottom of the movable table 3. The cylinder 9 is located at the side of the movable table 3.

The cylinders 6, 8 for the X- and Y-axis can be any kind of cylinders that can move the movable tables 2, 3 back and forth. However, they are required to stop the movable tables 2, 3 with a high degree of accuracy. Thus a servo cylinder is best used. However, a driving motor, an oil- or air-pressure cylinder, etc. may be used with a mechanism for positioning when a high degree of accuracy is not needed for positioning.

Figure 3:
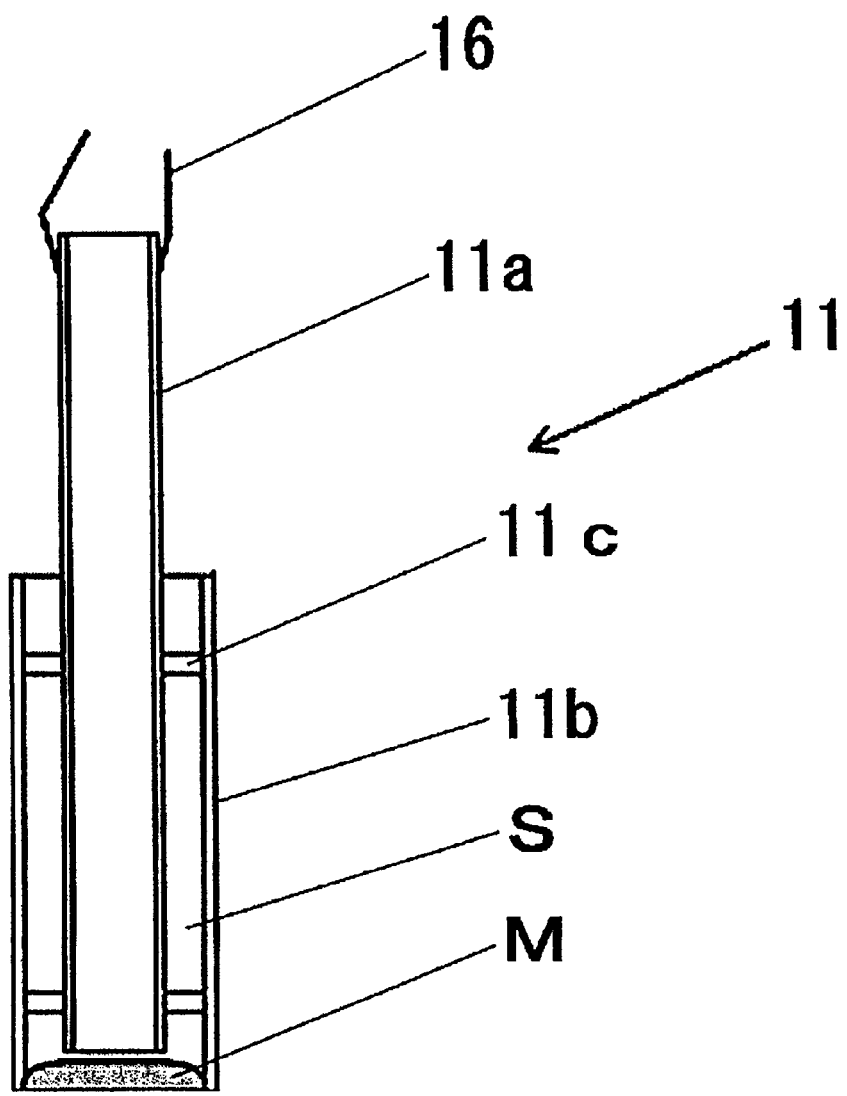
FIG. 3 is a sectional view of the suction nozzle of the present invention.

As shown in FIG. 3, the suction nozzle 11 is double-layered. It has an inner cylinder 11a that is a cylinder that is open at the bottom and an outer cylinder 11b that coaxially covers the inner cylinder 11a. A passage S for introducing ambient air is formed by the inner cylinder 11a and the outer cylinder 11b. For the present embodiment the ratio of the diameter of the outer cylinder 11b to that of the inner cylinder 11a is about 1.5. However the ratio may vary based on the materials, specific weights, etc., of the powders and granular materials M. The outer cylinder 11b is connected to and supported by the inner cylinder 11a by a plurality of stays 11c.

The bottom of the outer cylinder 11b projects from the bottom of the inner cylinder 11a. Thus a space is formed so that the powders and granular materials M are suctioned into the inner cylinder 11a while they are mixed with the ambient air that is introduced through the passage S. For the present embodiment the distance from the bottom of the inner cylinder 11a to that of the outer cylinder 11b is 10 to 20 mm. If the distance is too small, the space for mixing the ambient air and the powders and granular materials become narrow. Thus the flowability of the powders and granular materials M is not great enough. If the distance is too large, only the ambient air is suctioned and so the efficiency of suctioning the powders and granular materials M is reduced.

Further, the outer cylinder 11b has such a length that, when its bottom is located near the bottom of the container 4, its top is always located above the surface of the powders and granular materials M.

Since the suction nozzle 11 is double-layered, air is mixed with the powders and granular materials M so as to improve the flowability of the powders and granular materials, which have deteriorated due to compaction by their own weight or vibrations, moisture, and so on. Thus the powders and granular materials M can all be suctioned.

The suction nozzle 11 is attached to the device 12 for moving the suction nozzle up and down. The device 12 is used for inserting the suction nozzle 11 into the container 4.

The device 12 for moving the suction nozzle up and down comprises an arm 14 to attach the suction nozzle 11 at the end of it, a cylinder 15 that has a rod that is attached near the end of the arm 14 that is opposite the end where the suction nozzle 11 is attached, and a platform 13 to which the cylinder 15 is attached. The suction nozzle 11 is moved up and down by the elongation and contraction of the cylinder 15 via the arm 14.

The cylinder 15 can be any kind of cylinder that moves the suction nozzle 11 up and down. However, it is required to accurately stop the suction nozzle 11 and accurately position it. Thus a servo cylinder is best used. However, a driving motor, oil or air pressure-cylinder, etc. may be used with a mechanism for positioning when a high degree of accuracy is not needed for positioning the suction nozzle 11.

Figure 4:
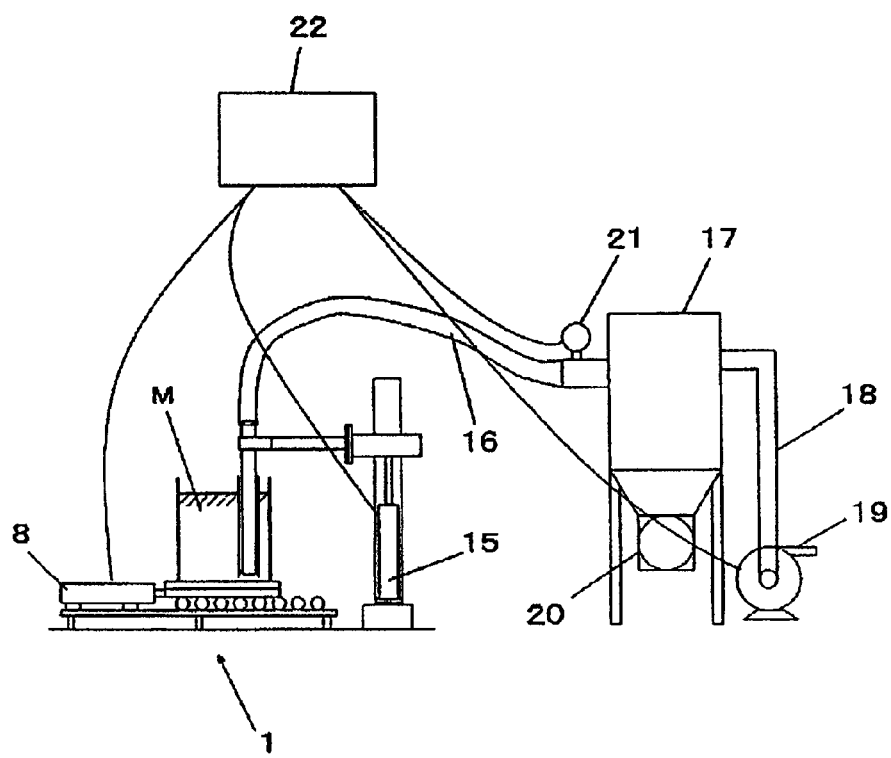
FIG. 4 is an embodiment of the system that utilizes the present invention.

FIG. 4 shows the entire system for the machine for suctioning the powders and granular materials. A dust collector 17 is made to be in a condition of negative pressure by a suctioning source 19 via a suction duct 18. The powders and granular materials M are suctioned by the suction nozzle 11 via a suction hose 16. The powders and granular materials M that are suctioned are for a while collected by the dust collector 17. Then they are discharged from a rotary valve 20.

For the present embodiment a blower is used for the suctioning source 19. The suctioning source 19 may be any kind of equipment to produce a condition of negative pressure, such as a ring blower and a vacuum pump.

A pressure sensor 21 is provided at an inlet of the dust collector 17 to sense if the suction hose 16 is clogged when suctioning.

Further, a controller 22 is provided for controlling inputs and outputs for the cylinders 6, 8, 15, the suctioning source 19, and the pressure sensor 21. The controller 22 determines, as an initial setting, the best routing pattern for the positions of the suction nozzle 11 to be inserted by inputting the size of the container 4 that is mounted on the movable table 3 for the Y-axis and by computing the positions for inserting the suction nozzles 11 so as to suction all the powders and granular materials M in the container 4. That is, the routing pattern is geometrically computed so that the number of positions for the suction nozzle 11 to be inserted that is required for suctioning all the powders and granular materials M in the container 4 is small and so that the distance of the horizontal movement of the movable table is short.

One operation of the step of suctioning the powders and granular materials comprises the following: lowering the suction nozzle 11 while suctioning; stopping it at the bottom of the container; raising it while suctioning; stopping it at the surface of the container; and moving it to the next position to be inserted. The routing patterns for the positions to be inserted determine the positions where the step of suctioning the powders and granular materials in the container is performed. These positions are appropriate positions that are properly determined.

Figure 5:
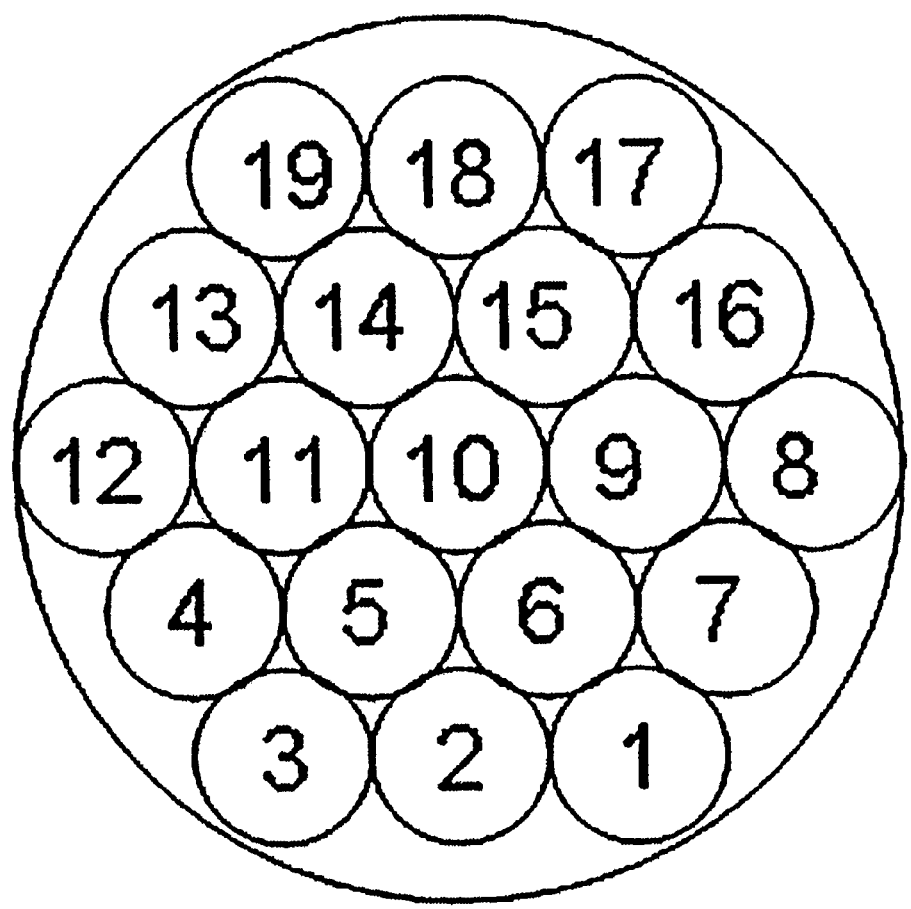
FIG. 5 is an exemplary routing pattern of the positions where the suction nozzle of the present invention is inserted.

The routing patterns for the positions to be inserted are determined based on the number of the section of the suction nozzle 11 that corresponds to the open area of the container. FIG. 5 shows an example. In this example, the suction nozzle 11 is sequentially moved from position No. 1 to position No. 19 to perform the step of suctioning the powders and granular materials 19 times.

If the remaining amount of the powders and granular materials in the container must be further reduced, the controller 22 increases the number of steps to do so.

Once the routing pattern for the suction nozzle 11 to be inserted is determined, the controller 22 outputs the directions for the strokes of the cylinders 6, 8, 15 so as to move the tip of the suction nozzle 11 to the target position. Since the remaining amount or amount suctioned of the powders and granular materials can be seen from a load meter 10 while suctioning or after suctioning, the operation of the suction nozzle 11 is repeated to suction the powders and granular materials such that there are no remaining powders and granular materials. When the remaining amount of the powders and granular materials M becomes small and the height of the surface of the powders and granular materials M becomes low, the movement of the suction nozzle 11 upward and downward can be shortened.

In the present embodiment, a load meter is used. But if no load meter is used, the pattern for the suction nozzle 11 to be inserted can be determined by performing trial suctions. Then the pattern is manually set in the controller 22, to thereby suction all the powders and granular materials.

Figure 6:
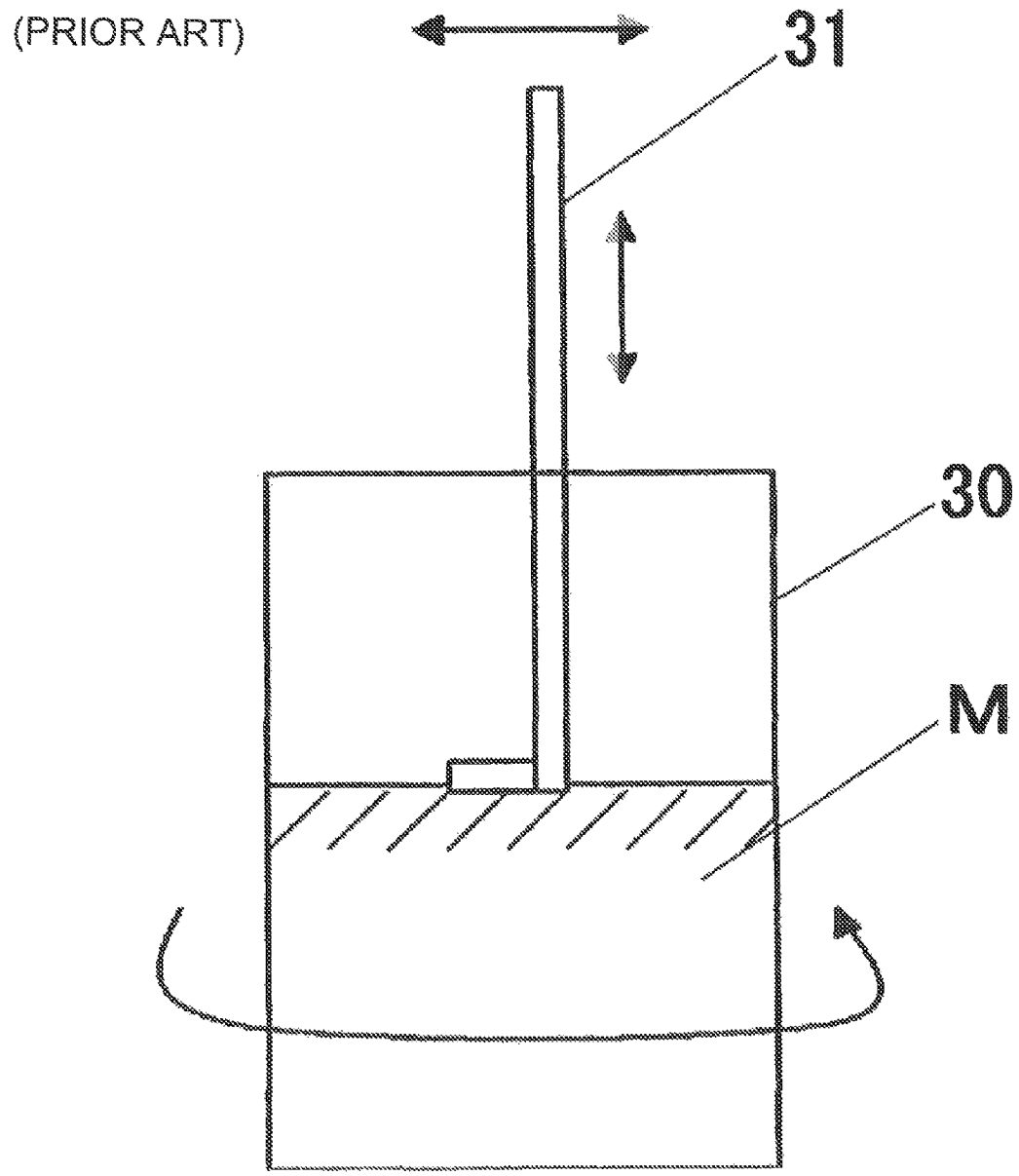
FIG. 6 shows an example of the prior art.
Figure 7:
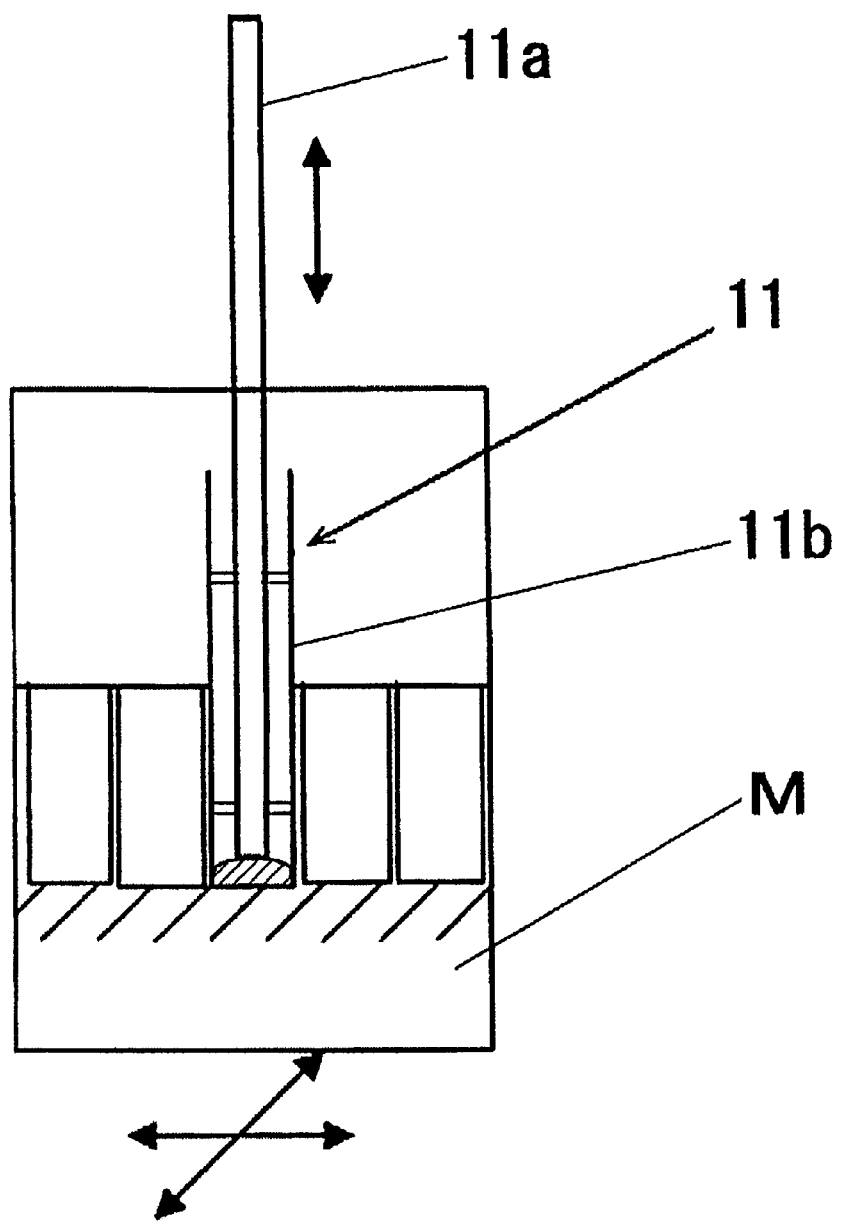
FIG. 7 shows a simulation of the present invention.

FIGS. 6 and 7 illustrate simulations where compacted powders and granular materials M were suctioned by a prior-art method and the method of the present invention, respectively. The powders and granular materials M that were used had a volume and weight of 1.48 g/cc if the powders and granular materials at their initial state were filled in a container with a volume of 100 cc. They were compacted to have a volume and weight of 2.35 g/cc by tapping 180 times because it is assumed that the flowability of the powders and granular materials M over time deteriorate due to compaction by their own weight or by vibrations from outside, moisture, and so on.

By the prior-art method in FIG. 6 the container 30 was rotated on a horizontal stage. An L-shaped suction nozzle 31 was inserted from above into the container 30 to suction the powders and granular materials while the container 30 was being rotated and the suction nozzle 31 was being moved up and down and laterally (see Patent Literature No. 1, i.e., Japanese Patent Laid-open Publication No. 2001-130743). By this method, though the container 30 was rotated, only a part of the powders and granular materials on the surface could be suctioned. If the operation were to be continued in that condition, a lateral force would be applied to the suction nozzle 31, to thereby break the suction nozzle 31.

In contrast, by the present invention, as shown in FIG. 7, the powders and granular materials were well suctioned when the step of suctioning the powders and granular materials was repeated several times, by means of the double-layered suction nozzle 11, since the amount of the powders and granular materials to be suctioned was limited and air was mixed with the powders and granular materials. The limitation of the powders and granular materials was achieved, as shown in FIG. 7, by blocking the powders and granular materials M outside the suction nozzle 11 by means of the outer cylinder 11b and by suctioning only the powders and granular materials M that were within the space formed by the bottoms of the inner and outer cylinders 11a, 11b, where the powders and granular materials M were mixed with the ambient air.

The suction nozzle 11 is illustrated as stopping midway within the powders and granular materials, because the step of suctioning the powders and granular materials is performed several times so as to suction all the powders and granular materials M. FIG. 7 shows the suction nozzle 11 halfway through the operation.

Table 1 shows the results by suctioning the powders and granular materials by the method of the present invention and by the prior-art method. The powders and granular materials M would have had a volume and weight of 1.48 g/cc if the powders and granular materials at their initial state would have been filled in a container with a volume of 100 cc. They were compacted to have a volume and weight of 2.35 g/cc by tapping 180 times, assuming that the flowability of them over time deteriorates due to compaction by their own weight or by vibrations from outside, moisture, and so on. They were filled in a drum to be suctioned.

By the present invention the powders and granular materials of a mass of 190 kg were all suctioned by performing the step of suctioning the powders and granular materials four times. In contrast, not all powders and granular materials were suctioned by the prior-art method that is shown in FIG. 6.

TABLE 1

| Pattern | Present Invention | | Prior Art | |
| --- | --- | --- | --- | --- |
| | Height of surface of powders and granular materials: mm | Remaining amount: kg | Height of surface of powders and granular materials: mm | Remaining amount: kg |
| At start | 350 | 190 | 350 | 190 |
| First | 350 → 190 | 90 | Not able to suction | 190 |
| Second | 190 → 75 | 45 | | |
| Third | 75 → 45 | 20 | | |
| Fourth | 45 → 0 | 0 | | |

If the suction nozzle 11 were to be clogged during the operation, the pressure sensor 21 would indicate a value changing toward that of a negative pressure. Thus the suction nozzle can be prevented from clogging by temporarily increasing the air flow that is suctioned by the suctioning source 19 or by slowing the speed of the cylinder 15 to elongate it downwardly. When the remaining amount of the powders and granular materials is small, the air flow that is suctioned by the suctioning source 19 may be decreased so as to save energy. Further, by accelerating the movement of the suction nozzle 11 in the Z direction the performance can be improved and the time for an operation can be shortened.

Figure 8:
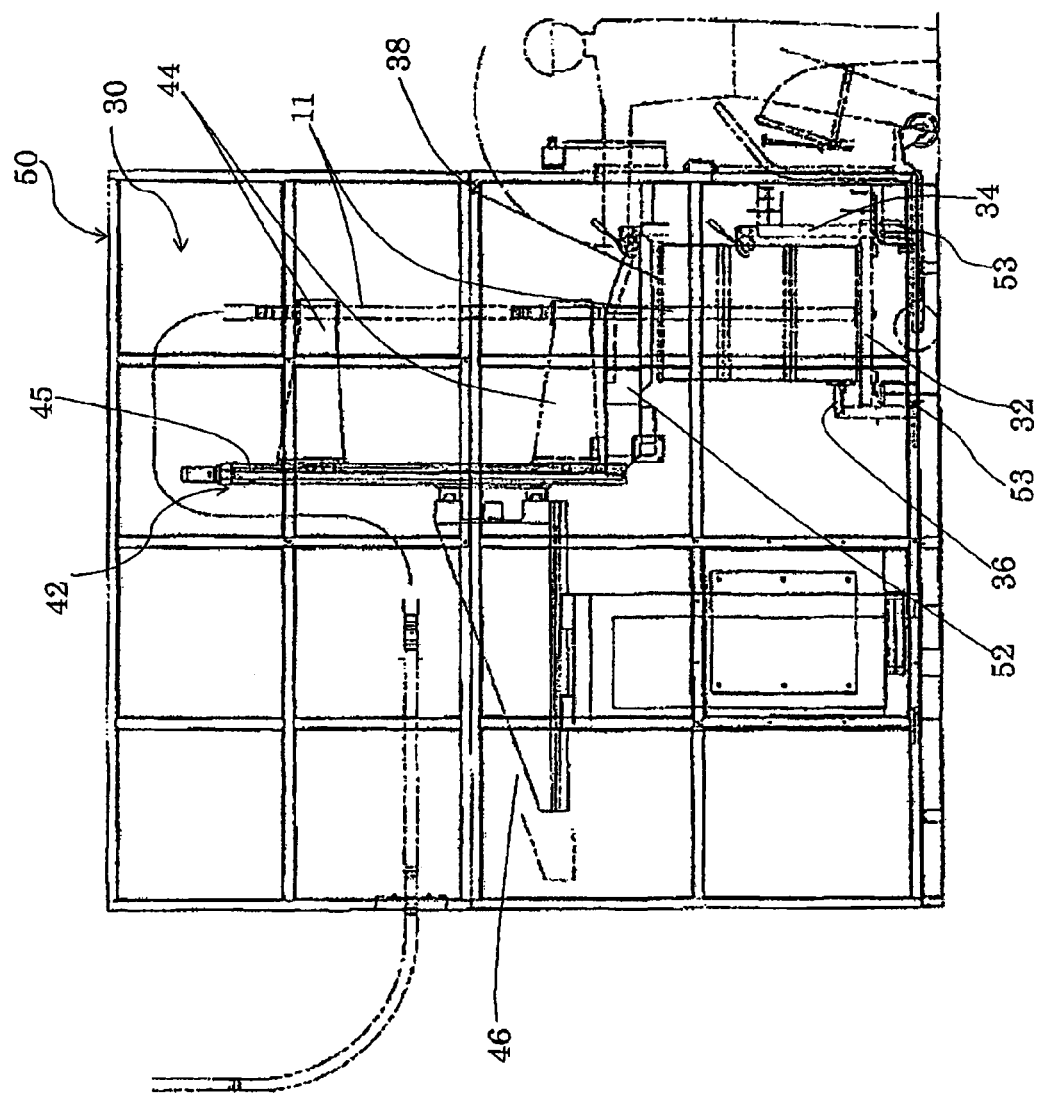
FIG. 8 is a side view of another embodiment of the machine and system for suctioning powders and granular materials of the present invention.

Next, with reference to FIG. 8, another embodiment of the machine for suctioning powders and granular materials of the present invention is described. FIG. 8 is a side view of the machine 30 for suctioning powders and granular materials. The machine 30 for suctioning powders and granular materials comprises a stationary table 32 that a container 4 that stores powders and granular materials M is mounted on and that is horizontally fixed to the stationary table, a double-layered suction 11 that is located above the stationary table 32 and that is connected to a suctioning source (not shown), and a device 42 for moving the suction nozzle 11 up and down in the container 4 that is mounted on the stationary table 32 and for horizontally moving it.

The stationary table 32 preferably fixes the container 4 by a guide, since the structure is simple. However, the method to fix the container 4 is not limited to a guide, but may use a clamp or the like. Once the container 4 is mounted on the stationary table 32, it is fixed to a predetermined position by the guide 34.

The device 42 for moving the suction nozzle comprises an arm 44 to attach the suction nozzle 11 at the end of it, a cylinder 45 that supports the end of the arm 44 that is opposite the end where the suction nozzle 11 is attached to, and a cylinder (not shown) for moving the arm 44 up and down, which arm is attached to the cylinder 45. The suction nozzle 11 is moved up and down by the elongation and contraction of the cylinder 45 via the arm 14. The cylinder 45 is vertically supported by a support 46 for the cylinder. The support 46 for the cylinder horizontally moves while it vertically supports the cylinder 45. The horizontal movement of the support 46 for the cylinder can be achieved in a way similar to that discussed for the movable tables 2, 3. Thus a duplicate description is omitted.

The suction nozzle 11 or the arm 44 comprises a detector 38 for detecting a cover that detects if a cover is removed from the container 4. The container 4, which stores the powders and granular materials M, is generally transported with a cover. Thus it is necessary to remove the cover before suctioning and transporting the powders and granular materials in the container 4. If the machine for suctioning the powders and granular materials were to be activated without removing the cover, then the suction nozzle 11 or the device 42 for moving the suction nozzle would be damaged. Thus the machine 30 for suctioning the powders and granular materials comprises the detector 38 for detecting a cover so that it detects if the cover has been removed and communicates this information to the controller 22 (see FIG. 4). The detector 38 for detecting a cover may use a laser, a magnetic force, or any other method. If the cover is removed, the operation will be continued. However, if the cover is detected on the container 4, the operation will be stopped and an alarm will be activated, depending on requirements.

If the machine 30 for suctioning the powders and granular materials is activated while no container 4 is mounted on the stationary table 32, the powders and granular materials M will not be supplied to the subsequent process, which needs to receive them. If they are not received, time will be lost or a malfunction will be caused or a defective product will be manufactured in the subsequent process. Thus the machine 30 for suctioning the powders and granular materials comprises a detector 36 for detecting the container so that it detects if the container 4 is mounted on the stationary table 32 and communicates with the controller 22 (see FIG. 4). The detector 36 for detecting the container may use any known method for the detection. It may also serve as the detector 38 for detecting a cover or as a measure 53 for the remaining amount of the powders and granular materials, which is below discussed.

The machine 30 for suctioning the powders and granular materials comprises the measure 53 that measures the remaining amount of the powders and granular materials M in the container 4, from which the powders and granular materials M are suctioned. It measures the remaining amount of the powders and granular materials M in the container 4 and communicates this information to the controller 22 (see FIG. 4). Since the remaining amount of the powders and granular materials M is measured, it can be determined if the step of suctioning the powders and granular materials has been completed. Further, the operation may be adjusted to improve the efficiency. For example, if the remaining amount of the powders and granular materials M is small, the air flow to suction the powders and granular materials M is increased, or the air flow is increased for suctioning the powders and granular materials that still remain on the bottom. The measure 53 for the remaining amount of the powders and granular materials mostly uses a weight scale. However, a shape sensor or a distance sensor may be used for measuring the remaining amount of the powders and granular materials M in the container 4.

Next, the function of the machine 30 for suctioning the powders and granular materials is described. The container 4 that stores the powders and granular materials M is mounted on the stationary table 32. The container 4 is fixed by the guide 34 at the predetermined position on the stationary table 32. After fixing the container 4 at the predetermined position, the machine 30 for suctioning the powders and granular materials is activated. The detector 36 for detecting the container detects the container 4 being mounted on the stationary table 32. If no container 4 is mounted on the stationary table 32, the subsequent operation will be stopped and an alarm will be activated, depending on requirements. Then, the detector 38 for detecting a cover detects if a cover is on the container 4. If no cover is detected, the subsequent operation will be performed. If a cover is detected, the subsequent operation will be stopped and an alarm will be activated, depending on requirements.

Next, the device 42 for moving the suction nozzle moves the suction nozzle 11 to the predetermined position in accordance with a predetermined routing pattern or the best routing pattern that has been computed based on the size of the container 4. Then at that position it lowers the suction nozzle 11 into the container 4. The suction nozzle 11 suctions the powders and granular materials M in the container 4. After the completion of suctioning the powders and granular materials at that position, the suction nozzle 11 is raised above the surface of the powders and granular materials M. Then it is moved to the next position in accordance with the routing pattern. At that position it is lowered to again suction the powders and granular materials M. These operations are repeated to suction the powders and granular materials M in the container 4.

Like the description for the machine 1 for suctioning powders and granular materials, since the double-layered suction nozzle 11 is used to suction the powders and granular materials M, the powders and granular materials M are mixed with air to be certainly suctioned. The suction nozzle 11 and the arm 44 are generally lighter than the movable tables 2, 3 on which the powders and granular materials M and the container 4 that stores them are mounted. Thus energy for the movement is saved and the accuracy is easily improved by horizontally moving the suction nozzle 11, compared to horizontally moving the movable tables 2, 3. If a weight scale is used for the measure 53 for the remaining amount of the powders and granular materials, then the weight will be accurately measured, because the container 4 is fixed at the predetermined position. That is, the remaining amount of the powders and granular materials can be accurately measured.

By measuring the remaining amount of the powders and granular materials M in the container 4 by the measure 53 for the remaining amount of the powders and granular materials during the step of suctioning the powders and granular materials M, energy can be saved. If the remaining amount of the powders and granular materials M is large, the air flow by the suctioning source will be increased so as to suction a large amount of the powders and granular materials. If the remaining amount is small, the air flow will be decreased to the proper amount that is required to suction the powders and granular materials M. Further, the remaining amount that cannot be suctioned is reduced by increasing the air flow when suctioning the powders and granular materials that remain on the bottom. Further, as the remaining amount of the powders and granular materials M decreases, the distance to move the suction nozzle 11 up and down (the distance to move the tip of the suction nozzle 11 above the surface of the powders and granular materials M) is decreased, to save time and energy.

Figure 9:
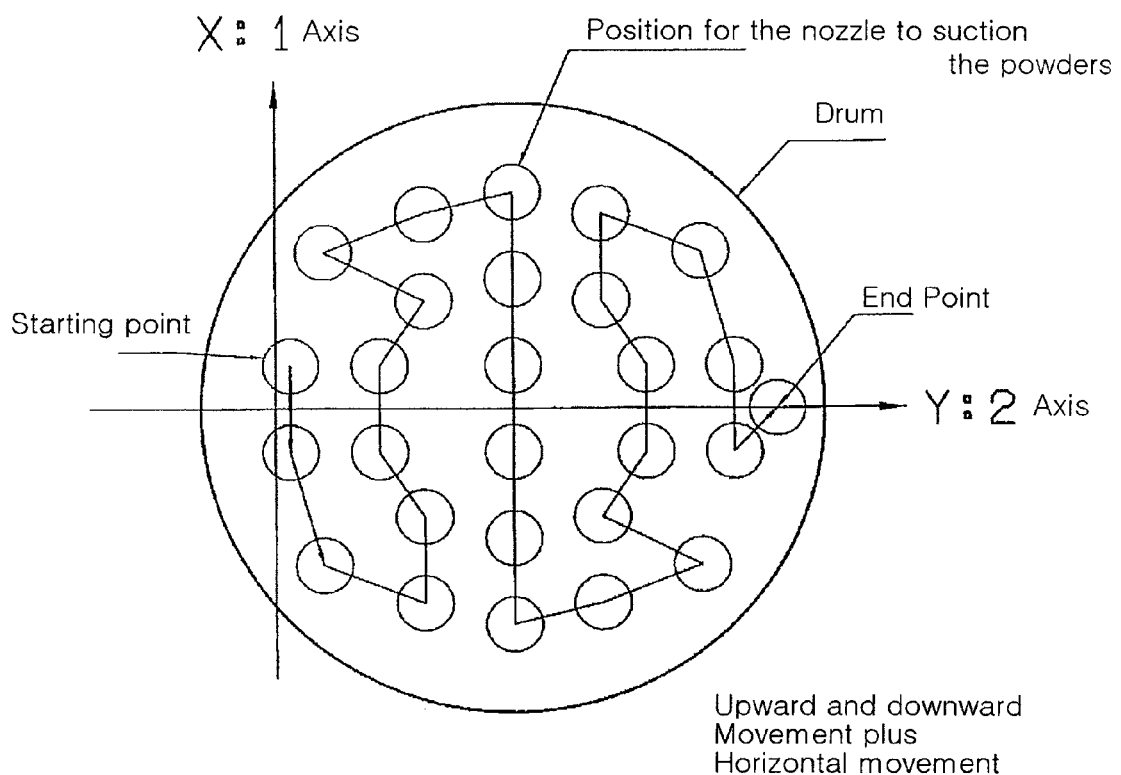
FIG. 9 illustrates an exemplary routing pattern of the positions for suctioning powders and granular materials.

Next, with reference to FIG. 9, an example of the best routing pattern for the positions to suction the powders and granular materials is described. As shown in FIG. 9, the routing pattern is preferably traversable so as to shorten the horizontal movement of the suction nozzle 11. The distance between the positions to suction the powders and granular materials by the suction nozzle 11 is determined based on the characteristics of the powders and granular materials, such as the hardness, the adhesive power, and the specific weight. It is determined so as to suction the powders and granular materials between the positions. If the characteristics of the powders and granular materials are known, then by inputting the size of the container 4 the controller will compute the geometrically-best routing patterns, i.e., a routing pattern that allows the suction nozzle 11 to suction all the powders and granular materials, that has a minimum number of positions to suction the powders and granular materials, and that requires the shortest route for the movements of the suction nozzle 11. If the characteristics are unknown, they may be found by suctioning the powders and granular materials M several times. Alternatively, a distance may be measured so that the powders and granular materials between the positions that are separated by that distance can be suctioned.

Figure 10:
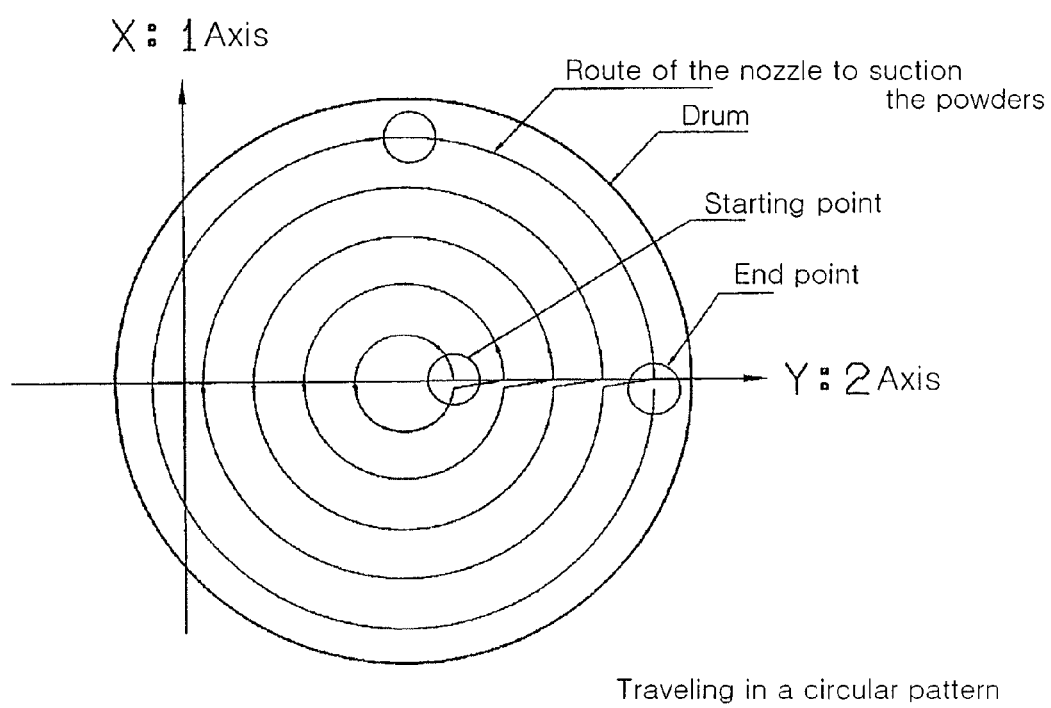
FIG. 10 illustrates an exemplary routing pattern of the positions for suctioning powders and granular materials, where the suction nozzle travels in a circular pattern in the container.

FIG. 10 shows a routing pattern to suction the powders and granular materials where the suction nozzle 11 travels in a circular pattern in the container 4. To suction the powders and granular materials M by having the suction nozzle 11 travel in a circular pattern in the container 4, the suction nozzle 11 is first inserted into the container so that to a minor extent only its tip is inserted into the powders and granular materials, but not to the bottom, to suction the powders and granular materials while traveling in a circular pattern. Since as discussed above the part of the suction nozzle 11 that is inserted in the powders and granular materials is short, a lateral force becomes small, to prevent the suction nozzle 11 from being damaged. The lateral force is applied to the suction nozzle 11 while it is traveling in a circular pattern. Since the suction nozzle 11 is double-layered, it can suction the powders and granular materials around its tip so as to reduce the lateral force that is generated by traveling in a circular pattern. The suction nozzle 11 is inserted into the powders and granular materials to the extent where no large lateral force is applied to it. It suctions the powders and granular materials while it is traveling in a circular pattern. It is gradually lowered in the container 4 to suction the powders and granular materials M.

Next, returning to FIG. 8, a system for suctioning powders and granular materials that has the machine 30 for suctioning the powders and granular materials and partitions 50 that house the machine 30 is described. The partitions 50 are formed by metal frames and transparent resin boards that are supported by the metal frames. The partitions 50 preferably have such strength that they are not broken by a bump by a human and such transparency that the inside can be seen from the outside. However, they are not limited to these uses. They generally surround the entire machine 30 for suctioning the powders and granular materials so as to prevent dust that is generated during the step of suctioning the powders and granular materials and its related steps from being scattered. They also prevent operators from coming close to the operating machine 30 for suctioning the powders and granular materials. The controller 22 (see FIG. 4) is not necessarily located within the partitions 50. If the height of the partitions 50 exceeds that of the container 4 that is mounted on the stationary table 32 so that the amount of dust that flows out from the tops is small, the tops of the partitions 50 may not need to be covered.

A doorway for carrying the container 4 in and taking it out and a doorway for operators to operate and maintain the machine 30 for suctioning the powders and granular materials are provided on the partitions 50. These doorways may be a common doorway. The doorway for operators to operate the machine 30 is not necessarily large enough to allow a person to pass through it, but may be a window so as to allow hands to pass through it to manually operate the machine 30. It is preferable in view of safety that the doorway can be locked during the operation of the machine 30 so that no person can enter inside the partitions 50 and no person can come close to the operating machine 30 for suctioning the powders and granular materials.

A dust-collecting hood 52 may be provided above the container 4 from which the powders and granular materials are suctioned. The dust-collecting hood 52 comprises a cover that covers the container 4, a duct (not shown) that suctions air from the cover, an air filter (not shown), and a blower (not shown) for suctioning air. Since the dust-collecting hood 52 is provided, dust that is generated from the container 4 is collected by it so as to prevent the dust from flowing outside. Unlike suctioning by the suction nozzle 11, suctioning air by the dust-collecting hood 52 may be done in a minute amount so as to suction the dust that flies in the air. Further, by suctioning air through the dust-collecting hood 52 while an operator enters the partitions 50 to maintain the machine 30 for suctioning the powders and granular materials, to carry the container 4 in or take it out, or to remove the cover, the operator is prevented from inhaling the dust. Further, if the dust is harmful to a human body, the impact on the body will be minimized.

It is preferable that the dust-collecting hood 52 be easily attached and detached so that it can be removed when the container 4 is carried in and taken out. It is further preferable that a sensor detect the dust-collecting hood 52 being attached or detached and communicate with the controller 22 (see FIG. 4) so that the hood 52 is definitely attached when the machine 30 for suctioning the powders and granular materials operates.

Working Example 1

As a working example, an experiment for suctioning powders and granular materials was done by using the system for suctioning powders and granular materials in FIG. 8. Powders and granular materials with a density of 2.35 g/cm$^3$ (the same as that shown in Table 1) were used. The container 4, i.e., a drum that stores 200 kg of the powders and granular materials, was mounted on the stationary table 32 and fixed by the guide at the predetermined position. The laser-type detector 38 for detecting a cover detected if a cover was on the container 4. The weight of the drum was measured by a load cell with a maximum load of 300 kg. Thus the drum that was mounted on the stationary table 32 was detected and the remaining amount of the powders and granular materials was measured. A cylinder with a horizontal power of 0.75 kW and a vertical power of 0.4 kW was used for the device 42 for moving the suction nozzle. The speed to move it was 400 mm/sec at maximum. The partitions 50 were formed with aluminum frames and PET boards. The tops of them were covered so as to encapsulate the machine 30 for suctioning the powders and granular materials.

A Roots blower with a capacity of 3.0 m$^3$/min and a pressure of −40 kPa and that was operable from 1.5 to 4.0 m$^3$/min by an inverter was used for the blower for suctioning air. It was operated at 2.6 m$^3$/min. For the suction duct, a sanitary pipe made of SUS304 (the Japan Industrial Standards) and a resin hose that were connected to each other were used.

Under those conditions the powders and granular materials were suctioned along the routing pattern in FIG. 9. For eight minutes powders and granular materials weighing 100 kg, i.e., a half of the possible total, were suctioned. After having suctioned the powders and granular materials, the suction nozzle 11 did not deform at all. No dust flew outside during the step of suctioning the powders and granular materials.

The partitions 50, the dust-collecting hood 52, the measure 53 for the remaining amount of the powders and granular materials, the detector 36 for detecting the container, and the detector 38 for detecting a cover, are described as being provided to the machine 30 for suctioning the powders and granular materials. However, they can also be provided to the machine 1 for suctioning the powders and granular materials. The machine 1 for suctioning the powders and granular materials and the machine 30 for suctioning the powders and granular materials differ in only this, i.e., moving the suction nozzle up and down at a fixed point in the container 4 on the movable table or moving the suction nozzle up and down, which nozzle moves horizontally, in the container 4 on the stationary table. The other structures are compatible.

INDUSTRIAL APPLICABILITY

Since all types of powders and granular materials can be suctioned by performing the step of suctioning powders and granular materials several times based on the remaining amount of the powders and granular materials, compacted powders and granular materials or powders and granular materials having a low flowability, other than those of the embodiment, can all be suctioned.

The invention claimed is:

1. A machine for suctioning powders and granular materials that is used for a facility for transporting powders and granular materials that are stored in a container, the machine comprising:
 a movable table that a container that stores powders and granular materials is mounted on and that moves in a horizontal plane;
 a device for driving the movable table;
 a double-layered suction nozzle that is located above the movable table and that is connected to a suctioning source;
 a device for moving the suction nozzle up and down in the container that is mounted on the movable table; and a controller that controls the device for driving the movable table and the device for moving the suction nozzle up and down, wherein by inputting a size of the container, the controller determines a routing pattern by computing the positions of the suction nozzle to be inserted; and wherein, while the movable table is moved, the suction nozzle is inserted in positions in the container to suction the powders and granular materials therein.

2. A machine for suctioning powders and granular materials that is used for a facility for transporting powders and granular materials that are stored in a container, the machine comprising:

a stationary table that a container that stores powders and granular materials is mounted on, that is horizontally fixed, and that has a measuring device;

a double-layered suction nozzle that is located above the stationary table and that is connected to a suctioning source;

a device for moving the suction nozzle up and down in the container that is mounted on the stationary table; and a controller that controls the device for moving the suction nozzle up and down, wherein by inputting a size of the container, the controller determines a routing pattern by computing the position of the suction nozzle to be inserted; and wherein the suction nozzle is inserted in positions in the container to suction the powders and granular materials therein.

3. The machine for suctioning powders and granular materials of claim 2, wherein the stationary table fixes the container by using a guide.

4. The machine for suctioning powders and granular materials of claim 1 or 2 further comprising:

a detector for detecting a cover that detects if a cover is on the container.

5. The machine for suctioning powders and granular materials of claim 1 further comprising:

a detector for detecting the container that detects if the container is mounted on the movable table.

6. The machine for suctioning powders and granular materials of claim 1 or 2 further comprising:

a measure for measuring a remaining amount of the powders and granular materials in the container.

7. A system for suctioning powders and granular materials comprising:

the machine for suctioning powders and granular materials according to claim 1; and partitions that house the machine for suctioning powders and granular materials.

8. The system for suctioning powders and granular materials according to claim 7 further comprising:

a dust-collecting hood above the container for collecting dust that is generated from the container that stores the powders and granular materials and that is mounted on the movable table of the machine for suctioning powders and granular materials that is housed with the partitions.

9. A method for suctioning powders and granular materials by using the machine for suctioning powders and granular materials of claim 1 to transport the powders and granular materials that are stored in the container, the method comprising the steps of:

mounting the container that stores the powders and granular materials on the movable table;

moving the movable table to arbitrary positions by the device for driving the movable table; and suctioning the powders and granular materials by inserting the suction nozzle at multiple positions in the container;

determining a routing pattern for positions to be inserted by computing the positions for the suction nozzle to be inserted in the container that stores the powders and granular materials based on a size of the container input to the controller.

10. A method for suctioning powders and granular materials by using the machine for suctioning powders and granular materials of claim 2 to transport the powders and granular materials that are stored in the container, the method comprising the steps of:

mounting the container that stores the powders and granular materials on the stationary table;

moving the suction nozzle to arbitrary positions by the device for moving the suction nozzle; and suctioning the powders and granular materials by inserting the suction nozzle at multiple positions in the container or by inserting and having the suction nozzle travel in a circular pattern in the container;

determining a routing pattern for positions to be inserted by computing the positions for the suction nozzle to be inserted in the container that stores the powders and granular materials based on a size of the container input to the controller.

11. The method for suctioning powders and granular materials of claim 9 or 10, wherein in the step of suctioning the powders and granular materials an air flow that is suctioned by the suctioning source is adjusted based on a measurement of a remaining amount of the powders and granular materials in the container or a measurement by a pressure sensor to see if no occlusion occurs in a route for suctioning powders and granular materials.

12. The machine for suctioning powders and granular materials according to claim 2 further comprising:

a detector for detecting the container that detects if the container is mounted on the stationary table.

13. A system for suctioning powders and granular materials comprising:

the machine for suctioning powders and granular materials according to claim 2; and partitions that house the machine for suctioning powders and granular materials.

14. The system for suctioning powders and granular materials according to claim 13 further comprising:

a dust-collecting hood above the container for collecting dust that is generated from the container that stores the powders and granular materials and that is mounted on the stationary table of the machine for suctioning powders and granular materials that is housed with the partitions.

* * * * *